United States Patent Office 3,567,767
Patented Mar. 2, 1971

3,567,767
PROCESS FOR GAS PHASE SYNTHESIS OF VINYL ESTERS
Teruo Yasui and Seishiro Nakamura, Kurashiki, Japan, assignors to Kurashiki Rayon Co., Ltd., Kurashiki, Okayama Prefecture, Japan
No Drawing. Filed Dec. 9, 1966, Ser. No. 600,391
Claims priority, application Japan, Dec. 17, 1965, 40/77,266
Int. Cl. C07c 67/04
U.S. Cl. 260—497                                10 Claims

ABSTRACT OF THE DISCLOSURE

An improved process for the preparation of vinyl esters by a process which comprises contacting a gaseous mixture composed of ethylene, oxygen, and organic aliphatic mono-carboxylic acid having up to 4 carbon atoms with a catalyst system composed of palladium, an acetate of an alkali metal carrier at an elevated temperature, and recovering the formed corresponding vinyl ester, the improvement which comprises employing as said catalyst carrier alumina having a surface area of 60–150 $m.^2/g.$ and a purity of no lower than 99%, said catalyst carrier being prepared by the steps comprising forming a basic aluminum sulfate sol by adding carbonate to an aqueous aluminum sulfate solution, heating the sol to gel the same, removing sulfate ions therefrom, drying and calcining the same at a temperature of 750 to 1100° C., the oxygen being present in said gaseous mixture in an amount of from 5–20% based on the sum volume of ethylene and oxygen while said organic aliphatic mono-carboxylic acid is present from 5–15% based on the sum volume of ethylene and oxygen.

---

This invention relates to a process for gas phase synthesis, from ethylene, molecular oxygen and organic carboxylic acids, of the corresponding vinyl esters. More particularly, the invention relates to a process for the continuous preparation of vinyl esters with high efficiency, carrying out the reaction in the presence of a high activity catalyst under a low partial pressure of oxygen and organic carboxylic acids.

Numbers of reports have already been made on gas phase and liquid phase synthesis of vinyl esters from ethylene, oxygen and organic carboxylic acids using palladium as the chief catalyst, which provide a fair base to the bielef that the gas phase synthesis is more advantageous than the liquid phase synthesis from the standpoints of industrial economy and reaction engineering.

Whereas, those catalysts used in the conventional processes for the gas phase synthesis have but low catalytic activities and consequently the synthesis must be performed at high temperatures to achieve a high space time yield. However, under such high reaction temperatures excessive oxidation (formation of $CO_2$) takes place to lower the yield of object vinyl ester, and for avoiding that phenomenon the reaction is necessarily performed in an atmosphere of high partial pressure of an organic carboxylic acid. Those necessities in turn provide main causes for notable deterioration with time passage in the activities of the catalyst used. For these drawbacks the advantages of the gas phase synthesis have not been fully utilized.

Accordingly, therefore, the object of the present invention is to provide a process for the continuous gas phase synthesis of vinyl esters from ethylene, oxygen and corresponding organic carboxylic acids with industrial advantage, employing a catalyst system having an improved and high catalytic activity and at the same time minimizing the deterioration in its catalytic activity with time lapse by performing the reaction under a low partial pressure of oxygen and organic carboxylic acid.

The vinyl ester preparation in accordance with the invention comprises contacting a gaseous mixture composed of ethylene, 5–20 percent of oxygen based on the sum volume of ethylene and oxygen and 5–15 percent of an organic carboxylic acid based on the sum volume of ethylene and oxygen, with a catalyst system composed of palladium and an acetate of an alkali metal carried on alumina having a surface area of 60–150 $m.^2/g.$ and a purity of no lower than 99%, at an elevated temperature, and recovering the formed corresponding vinyl ester, the said catalyst carrier being prepared by the steps comprising forming sol of basic aluminum sulfate (aluminum oxide containing sulfate ion) by adding calcium carbonate to aqueous solution of aluminum sulfate, heating the sol to gel the same, removing sulfate ion therefrom, drying and calcining the same at a temperature of from 750 to 1,100° C.

Our discoveries which provided the bases for the present invention and the full particulars of the subject process will be disclosed hereinbelow.

Generally catalysts to be used in gas phase reaction are required to be highly active, to show little activity deterioration with time lapse and to have an ability to readily disperse the reaction heat. Therefore it is important that the catalyst components should be carried on suitable carriers. As such, normally substances of large surface areas are chosen for better distribution of the catalyst components. However in the reaction we are presently concerned with, the catalytic activity is not proportional to the surface area of the carrier. For example, when the experiments were run using activated carbon of more than 500 $m.^2/g.$ in surface area, alumina of about 250 $m.^2/g.$ and Macroport" (commercial alumina produced by Norton International Inc., U.S.A.) of extremely small surface area less than 1 $m.^2/g.$ as the carriers, the catalytic activities exhibited were not proportional to the surface areas of the carriers, but in certain cases the catalyst on the carrier of smaller surface area showed even higher activity, contrary to the conventional expectation. This fact suggests a close relevancy of the carrier to the reaction in chemical and physical sense, but simultaneously indicates that the appropriate selection of material and surface area of the carrier is very difficult.

We discovered that a catalyst system composed of metal palladium and an alkali metal acetate carried on a carrier of 60–150 $m.^2/g.$ in surface area which is obtained by calcining bead alumina of no less than 99% purity formed of dried alumina gel made from aluminium sulfate and calcium carbonate shows excellent catalytic activity, that using the same catalyst system satisfactory time space yield can be obtained even under low partial pressures of organic carboxylic acid and oxygen, and that thus it is possible to produce vinyl esters with high efficiency while minimizing the deterioration with time passage in the catalytic activity.

Industrially advantageous preparation methods of the bead alumina used as the material for the catalyst carrier in the invention are already known from British Pat. No.

980,893, U.S. Pat. No. 3,183,194 and German Pat. No. 1,181,685. The bead alumina has high mechanical strength, is crack free and has a surface area of about 200 m.²/g. Such bead alumina is presently produced by Mizusawa Chemical & Co., Japan, and is commercially available under the trade name of "Neobead-C."

We found that the above bead alumina having a surface as it is becomes highly useful as the catalyst carrier to be employed in gas phase synthesis of vinyl esters when calcined to have a surface reduced to 60–150 m.²/g., preferably 110–140 m.²/g. Bead alumina having surface areas outside the above-specified range do not form useful carriers.

Appropriate calcining temperatures to impart the surface areas of 60–150 m.²/g. to the alumina ranges 750°–1100° C., preferably 800°–1000° C., inter alia, 850°–950° C. Thus carriers which serve for the highest catalytic activity are obtained (cf. Example 1 which later appears). Thus obtained carrier has high mechanical strength, abrasion resistance and heat resistance, and gives a catalyst system having high catalytic activity for vinyl ester synthesis which shows little deterioration in that activity with time passage and further causes no appreciable side reaction.

In contrast, carriers of alumina contents less than 99% do not give satisfactory results even if they have surface areas falling within the above-specified range. Again carriers meeting both the surface area and alumina content requirements still are ineffective unless the alumina is that obtained from the gel of the above-described basic aluminium sulfate. Normally active alumina used as desiccant or catalyst carrier is formed from gel of aluminium hydroxide. Thus it is possible to obtain alumina of a purity higher than 99% by drying the gel of aluminium hydroxide made from aluminium chloride and sodium hydroxide. However such has a surface area of 200 m.²/g. or greater, and is ineffective. It is again possible to reduce the surface area to 60–150 m.²/g. by calcining the same at suitable temperatures, but the product still fails to exhibit the effectiveness as that of the carrier used in the subject invention. Catalyst systems carried on such conventional alumina, active carbon and the like showed catalytic activities in the order of about one-fifth that of the catalyst of our invention.

The catalyst system of the invention is prepared by having the above calcined bead alumina carry metal palladium and an alkali metal acetate which are the catalyst components. The amounts of the catalyst components are, based on the weight of the carrier, 0.1–5%, preferably 0.5–2.5% as to metal palladium, and 0.1–15%, preferably 0.2–10%, inter alia, 0.3–2.5% as to alkali metal acetate. Preferred alkali metal acetates include lithium acetate, potassium acetate and sodium acetate, potassium acetate being particularly preferred. Metal palladium can be deposited onto the carrier in the manner known per se, for example, by mounting palladium salt such as palladium chloride, palladium acetate, etc. onto the carrier and thereafter reducing the palladium salt on the carrier to metal palladium with for example, alkaline solution of hydrazine hydrate. Also the alkali metal acetate can be carried by adding the same in aqueous solution form to the carrier already carrying metal palladium, and drying the same.

The deterioration in catalytic activity with time passage and the selectivity of the reaction are controlled mainly by the composition of the reaction gas. Therefore the quantitative ratios of oxygen and organic carboxylic acid to ethylene in the gaseous mixture to be supplied to the reaction zone must be suitably selected.

As palladium in the catalyst system is a very expensive material, it is extremely important from the point of economy to minimize the deterioration in catalytic activity with time passage.

We found that, in the vinyl ester synthesis using the above-described catalyst system, the catalytic activity deterioration with time passage can be minimized by keeping the partial pressure of organic carboxylic acid to no greater than 15% to the sum pressure of ethylene and oxygen. Such low partial pressure of organic carboxylic acid has never been employed because such causes low yield of the object vinyl ester and low selectivity of the reaction and is industrially disadvantageous. Surprisingly, however, because the catalyst of our invention has very high activity level and excellent reaction selectivity, even under such low partial pressure of organic carboxylic acid, vinyl esters are obtained with satisfactorily high yield. This is one of the most notable characteristics of the process of our invention.

When the catalyst of the invention is used under the partial pressure of organic carboxylic acid not higher than 15% of the sum pressure of oxygen and ethylene, deterioration in catalytic activity time passage is not appreciable, and after 15 hours of the reaction the deterioration is not so much as 1 percent. Whereas when the partial pressure of the organic carboxylic acid is raised to around 20%, the deterioration in catalytic activity after 15 hours' reaction increases to about 5%. The lower limit of the partial pressure of organic carboxylic acid is 5%, preferably no lower than 7%. Below 5%, yield of vinyl ester decreases and by-production of carbon dioxide increases.

The ratio of oxygen to ethylene should be selected within the range free from the danger of explosion. Considering the concurrent presence of carboxylic acid, still it is dangerous that the oxygen content exceeds 35% by volume to the sum volume of ethylene and oxygen. In order to heighten the reaction selectivity to lower side-formation of carbon dioxide and to minimize the catalytic activity deterioration with passage of time, it is necessary that the oxygen content be 5–20% to the sum volume of ethylene and oxygen, the range of 7–15% being particularly preferred.

The significance of above limitations on partial pressures of oxygen and organic carboxylic acid will be demonstrated with experimental results. In the experiments, the reaction conditions and the space time yields of the corresponding vinyl esters were as below-indicated.

Catalyst used: Bead alumina having a surface area of 120 m.²/g. which was calcined at 900° C., carrying 2.2% of palladium and 2.0% of potassuim acetate.

REACTION CONDITIONS

|  | Ethylene: oxygen: acetic acid (volume) | Space velocity (l./catalyst hr.) | Reaction temp. (° C.) |
|---|---|---|---|
| Experiment No.: |  |  |  |
| I | 9 : 1 : 1 | 200 | 110 |
| II | 7.5 : 2.5 : 1 | 200 | 110 |

RESULTS

|  | Space time yield of vinyl acetate (vinyl acetate g./ catalyst l. hr.) | |
|---|---|---|
|  | Exp. I | Exp. II |
| Reaction time (hr.): |  |  |
| 1 | 45.0 | 57.1 |
| 3 |  | 45.5 |
| 6 | 44.8 | 40.0 |
| 10 | 46.0 | 29.2 |
| 20 | 44.6 | 10.1 |
| 30 | 44.0 |  |
| 40 | 45.3 |  |
| 50 | 45.0 |  |
| 60 | 45.1 |  |

As can be seen from the above experimental results, in Exp. No. I no appreciable change in catalytic activity was observed over the period of 60 hours. In contrast, in Exp. No. II in which the oxygen partial pressure was high, the initial catalytic activity was higher than the case of Exp. No. I, but after 20–50 hours it decreased to 20% or below that in Exp. No. I.

In accordance with the process of the invention, the catalytic activity deterioration with time passage can be minimized, but still after a very long period the deterioration becomes observable. If desired, then, the catalyst which became less active can be reactivated. The reactivation can be achieved by heating the catalyst with a gas such as nitrogen, hydrogen, air, ethylene, methan and ethan to about 110°–150° C.

In order to disperse the reaction heat and cause the effective manifestation of the catalytic activity, employment of divided oxygen supply system in which the reaction zone is divided into plural stages and at each stage oxygen is fed to replenish that consumed in the preceding stage is recommended. As to the organic carboxylic acid, again its supply in divided portions is preferable similarly to the case of oxygen. With that manner of operation it was found that the catalyst can be used with high efficiency and minimized deterioration in catalytic activity with passage of time.

The reaction concerned with the invention may be performed at elevated temperatures, i.e., 80°–200° C., the preferred range being 100°–125° C. While in conventional practice, normally, temperatures higher than 120° C. are employed. With the rise in the reaction temperature, the rate of reaction is accelerated, but the side-formation of carbon dioxide increases. At low temperatures the carbon dioxide formation is little but the reaction rate is low.

For raising catalytic activity per unit volume of the catalyst, it is desirable to perform the reaction under an elevated pressure, but when the pressure is excessively great the partial pressures of oxygen and organic carboxylic acid rise to aggravate the deterioration in catalytic activity. Accordingly the process of the invention is preferably performed at the pressure range of atmospheric to 5.0 atmospheres.

In practising the subject invention, the catalyst layer may take any of the forms such as fixed, fluidized or moving beds.

As organic carboxylic acids used as one of the starting materials in the invention, aliphatic monocarboxylic acids of no more than 4 carbon atoms such as acetic, propionic, and butyric acids may be named, among which acetic acid being the most effective and typical. When acetic acid is used, the corresponding vinyl ester produced is vinyl acetate.

The vinyl esters produced can be recovered from the gaseous reaction mixture suitably in acocrdance with the known practices such as cooling or solvent absorption.

The main advantages of the process of the invention may be summarized as follows. (1) The catalytic activity being high, the reaction need not be performed at high temperatures or in the atmosphere of large excess of carboxylic acid as in the conventional processes, and so the vinyl ester yield per the unit ethylene consumption and the vinyl ester yield per the carboxylic acid used are great. (2) The vinyl ester concentration in the liquid formed by cooling the gaseous product is high, allowing full utilization of the advantages inherent in the gas phase synthesis. (3) The reaction progresses with satisfactory rate under relatively low temperatures and therefore side-formation of carbon dioxide which results from complete combustion is negligible. (4) High catalytic activity level is maintained for a prolonged period with minimized deterioration with time lapse.

In the following working examples, parts are by weight. Examples 1–4 demonstrate the superiority of the catalyst of the invention to the conventional catalysts, and the rest of the examples are illustrative embodiments of the subject process.

EXAMPLE 1

Bead alumina having an $Al_2O_3$ content of 99.3% and a surface area of 210 m.$^2$/g. which are 10–14 mesh in size were calcined in air for 3–5 hours at varied temperatures as shown in Table 1 to form catalyst carriers. Incidentally, the said bead alumina was prepared in the following manner.

To a solution formed of 342 g. of aluminium sulfate dissolved in 800 cc. of water, 175 g. of $CaCO_3$ wetted with 30 cc. of water was added in small doses with thorough agitation. Whereupon carbon dioxide was generated and $CaSO_4$ was precipitated. Filtering $CaSO_4$ off, basic aluminium sulfate sol ($Al_2O_3 \cdot 1.1SO_3$) was obtained. The liquid had a pH of 3.38.

A Pyrex glass (hard glass) tube of 4 cm. in inner diameter and 1.5 m. in length provided with a band heater was filled with spindle oil and maintained at 85° C. and from the top thereof the said basic aluminium sulfate sol was dropped thereinto. The sol was gelled as it fell through the oil in bead form, and was collected at the bottom. Upon withdrawal the gel was thoroughly washed with flowing water and further thoroughly removed of sulfate ion with 0.5% aqueous ammonia treatment. After the following good washing with water, the gel was withdrawn from water and air-dried for 24 hours at 35° C. The well-dried product was further dried at 100° C. for 20 hours, and calcined for 5 hours at 500° C.

Separately, into 50 parts of water containing 0.3 part of conc. hydrochloric acid 1.3 parts of palladium chloride was dissolved, and to the resultant solution 35 parts of the above calcined carrier was added. The system was dried on a steam bath. The reduction of palladium chloride was performed by dropping onto the dried catalyst system a reducing liquid prepared by adding 2.5 parts of 80% hydrazine hydrate solution to 50 parts of 1 N sodium hydroxide solution. Thus reduced catalyst was thoroughly washed with water, placed in 10 parts of water containing 0.7 part of potassium acetate and then dried.

Thirty-five (35) grams of thus obtained catalyst was put into a Pyrex glass (hard glass) reaction tube of 20 mm. in diameter, and was immersed in an oil bath of 110° C. Over the catalyst, a gaseous mixture composed of, in terms of molar ratio, ethylene:oxygen:acetic acid=4:1:2 was passed at a flow rate of 8 l./hr.

Based on the results of quantitative analysis of carbon dioxide, vinyl acetate and acetaldehyde contents in the exhausted gas by means of gas chromatography, production rate and selectivity of vinyl acetate and selectivity of acetaldehyde were calculated as given in Table 1. The calculation of selectivity was done, for example as to vinyl acetate, in accordance with the formula below.

Selectivity of vinyl acetate $$= \frac{\text{vinyl acetate (mol)}}{\text{vinyl acetate (mol)} + \text{acetaldehyde (mol)} + \text{carbon dioxide (mol)} \times \frac{1}{2}} \times 100$$

In the table VOAc stands for vinyl acetate, this being true throughout the remaining part of the specification.

TABLE 1

| | Calcination temp. for carrier (° C.) | Surface area of carrier (m.²/g.) | Production rate of VOAc (g. VOAc/ l. cat. hr.) | VOAc selectivity (percent) | Acetaldehyde selectivity (percent) |
|---|---|---|---|---|---|
| Experiment No.: | | | | | |
| 1 | 550 | 200 | 12.1 | 88–90 | 2.0 |
| 2 | 700 | 175 | 12.3 | 88–90 | 2.1 |
| 3 | 800 | 150 | 33.2 | 92.1 | 0.7 |
| 4 | 900 | 120 | 40.1 | 94.0 | (¹) |
| 5 | 1,000 | 100 | 29.6 | 92.0 | (¹) |
| 6 | 1,100 | 65 | 20.0 | 91.8 | (¹) |
| 7 | 1,300 | 5 | 9.2 | 90.0 | (¹) |

¹ Below 0.1.

In the above, Exp. Nos. 3–6 are within the scope of the subject invention, and the rest are controls.

EXAMPLE 2

Employing the same manner of catalyst preparation and the same reaction conditions as described in Example 1, experiments were run with varied amounts of palladium carried on the carrier, with the results as given in the table below. As the carrier, the bead alumina calcined at 900° C. and having a surface area of 120 m.$^2$/g. was used.

TABLE 3

| | Palladium content (percent by weight) | VOAc yield (g./cat. l. hr.) |
|---|---|---|
| Experiment No.: | | |
| 15 | 0.2 | 7.6 |
| 16 | 0.5 | 14.9 |
| 17 | 1.0 | 26.6 |
| 4 | 2.2 | 40.1 |
| 18 | 5.0 | 45.6 |
| 19 | 7.5 | 45.5 |

From the results of Table 3, with a palladium content higher than 5.0% no notable improvement in catalytic activity is observable. Accordingly, the appropriate palladium content range is 0.1–5% by weight, preferably 0.5–2.5% by weight.

EXAMPLE 3

Using the same catalyst system employed in Experiment No. 4 of Table 1 (Example 1) except that the type and amount of alkali metal acetate was varied each time, experiments were run under the same reaction conditions as of Example 1 with the results shown in Table 4.

TABLE 4

| | Alkali acetate | (wt. percent) | VOAc yield (g./cat. l. hr.) |
|---|---|---|---|
| Experiment No.: | | | |
| 20 | KOAc | 0 | 10.7 |
| 21 | KOAc | 0.2 | 36.0 |
| 22 | KOAc | 0.5 | 38.4 |
| 4 | KOAc | 2.0 | 40.1 |
| 23 | KOAc | 5.0 | 38.5 |
| 24 | KOAc | 10.0 | 28.0 |
| 25 | NaOAc | 2.4 | 20.5 |
| 26 | LiOAc | 1.5 | 15.1 |

EXAMPLE 4

In the similar manner as described in Example 1, bead alumina (60–140 mesh in size) of an Al$_2$O$_3$ content of 99.3% was prepared, which was subsequently calcined in air for 4 hours at 900° C. Then in the similar manner as described in Example 2, 2.0 wt. percent of palladium and 5.0 wt. percent of potassium acetate were carried on the calcined alumina to form a catalyst system. 190 grams of the catalyst system was placed in a reaction tube of 60 mm. in diameter which was equipped with a glass filter at the bottom, and immersed in an oil bath of 120° C. The catalyst bed became fluidized upon blowing of a gaseous mixture composed of ethylene:oxygen:acetic acid=8.5:1.5:1.5 by volume ratio into the reaction tube from the bottom, at a rate of 300 l./hr. The production rate of vinyl acetate was 10.6 g./hr., and carbon dioxide formed was 5.1 mol percent to the vinyl acetate.

EXAMPLE 5

Two (2) parts of anhydrous palladium chloride was dissolved in 150 parts of water containing 1 part of conc. hydrochloric acid, and to the solution 100 parts of bead alumina of a purity higher than 99% and about 10 mesh in size which was calcined at 900° C. was added. The system was then dried on a steam bath, and the palladium salt was reduced with hydrazine. The system was then thoroughly washed with water until no chlorine ion was detected therein, and thereafter was immersed in 50 parts of water containing 5.0 parts of potassium acetate and dried.

Thus obtained catalyst system comprised 1.2 wt. percent of palladium and 5 wt. percent of potassium acetate. Three stainless steel reaction tubes of 28 mm. in inner diameter and each packed with 1 l. of the above catalyst were connected in series, and at the two connecting parts each one gas inlet was provided for oxygen and acetic acid replenishment. The tubes were equipped with oil jackets so as to maintain the reaction temperature of 110–115° C. From the entrance of the first reaction chamber a gaseous mixture composed of 350 l. of ethylene, 25 l. of oxygen and 25 l. of acetic acid was fed per hour under 2 atmospheres, the conversion ratios of oxygen and acetic acid at the exit of the first chamber were, respectively, 26.3% and 40%. From each of the gas inlets provided at the two connecting parts, a gaseous mixture composed of 6.6 l. of oxygen and 10 l. of acetic acid was fed per hour. As the result, the ethylene conversion at the exit of the last reaction chamber reached 8.7%, and 114 g./hr. of vinyl acetate was obtained. Carbon dioxide which is a by-product formed was 10 mol percent to the vinyl acetate.

What is claimed is:

1. In a process for the preparation of vinyl esters by a process which comprises contacting a gaseous mixture composed of ethylene, oxygen, and an organic lower alkanoic acid having 2–4 carbon atoms with a catalyst system composed of palladium and an acetate of an alkali metal on a catalyst carrier at an elevated temperature, and recovering the formed corresponding vinyl ester, the improvement which comprises employing as said catalyst carrier alumina having a surface area of 60–150 m.$^2$/g. and a purity of no lower than 99%, said catalyst carrier being prepared by the steps comprising forming a basic aluminum sulfate sol by adding carbonate to an aqueous aluminum sulfate solution, heating the sol to gel the same, removing sulfate ions therefrom, drying and calcining the same at a temperature of 750 to 1100° C., the oxygen being present in said gaseous mixture in an amount of from 5–20% based on the sum volume of ethylene and oxygen while said organic lower alkanoic acid is present from 5–15% based on the sum volume of ethylene and oxygen.

2. The process of claim 1 in which the organic lower alkanoic acid is acetic acid, and the vinyl ester obtained is vinyl acetate.

3. The process of claim 1 in which the reaction is performed in a reaction vessel in which at least two reaction zones are connected in series, while replenishing oxygen and organic lower alkanoic acid at the part or parts connecting the reaction zones.

4. The process of claim 1 in which the acetate of an alkali metal is potassium acetate.

5. The process of claim 1 in which the amount of palladium carried on the carrier is 0.1–5.0 percent by weight to the latter.

6. The process of claim 1 in which the amount of palladium carried on the carrier is 0.5–2.5 percent by weight to the latter.

7. The process of claim 1 in which the amount of the alkali metal salt carried on the carrier is 0.1–15 percent by weight to the latter.

8. The process of claim 1 in which the amount of the alkali metal salt carried on the carrier is 0.3–2.5 percent by weight to the latter.

9. The process of claim 1 in which the reaction temperature ranges 80°–200° C.

10. The process of claim 1 in which the reaction pressure ranges 1–5 atmospheres.

References Cited

FOREIGN PATENTS

| 1,397,083 | 4/1965 | France | 260—497 |
| 1,017,938 | 1/1966 | Great Britain | 260—497 |
| 1,407,526 | 6/1965 | France | 260—497 |

LORRAINE A. WEINBERGER, Primary Examiner

V. GARNER, Assistant Examiner

U.S. Cl. X.R.

252—448